July 1, 1941.
C. J. RYBICKY
2,247,412
MACHINE FOR FINISHING FORMS
Filed March 25, 1940
2 Sheets-Sheet 1
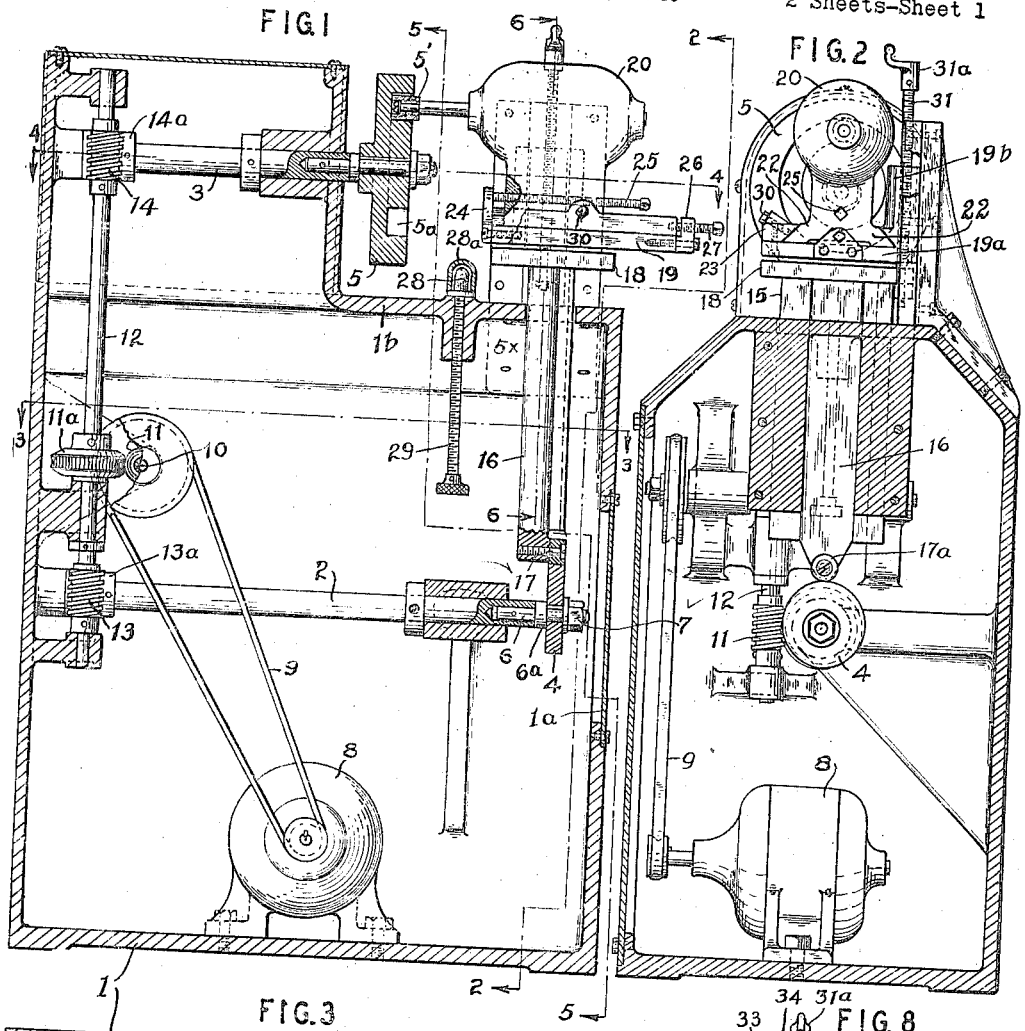
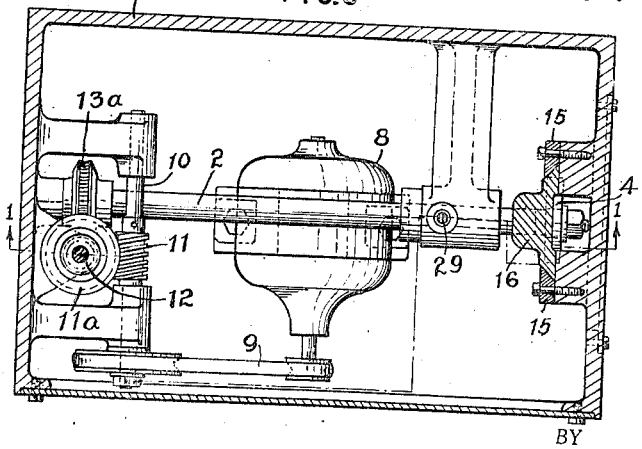
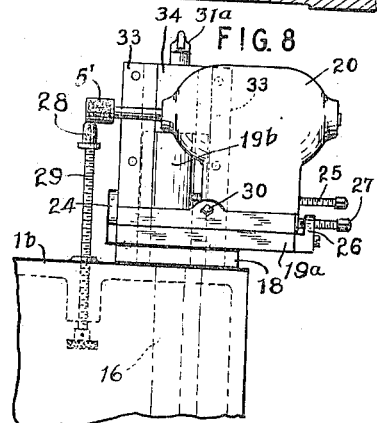
INVENTOR.
CHESTER J. RYBICKY.
Geo. B. Pitts
ATTORNEY.

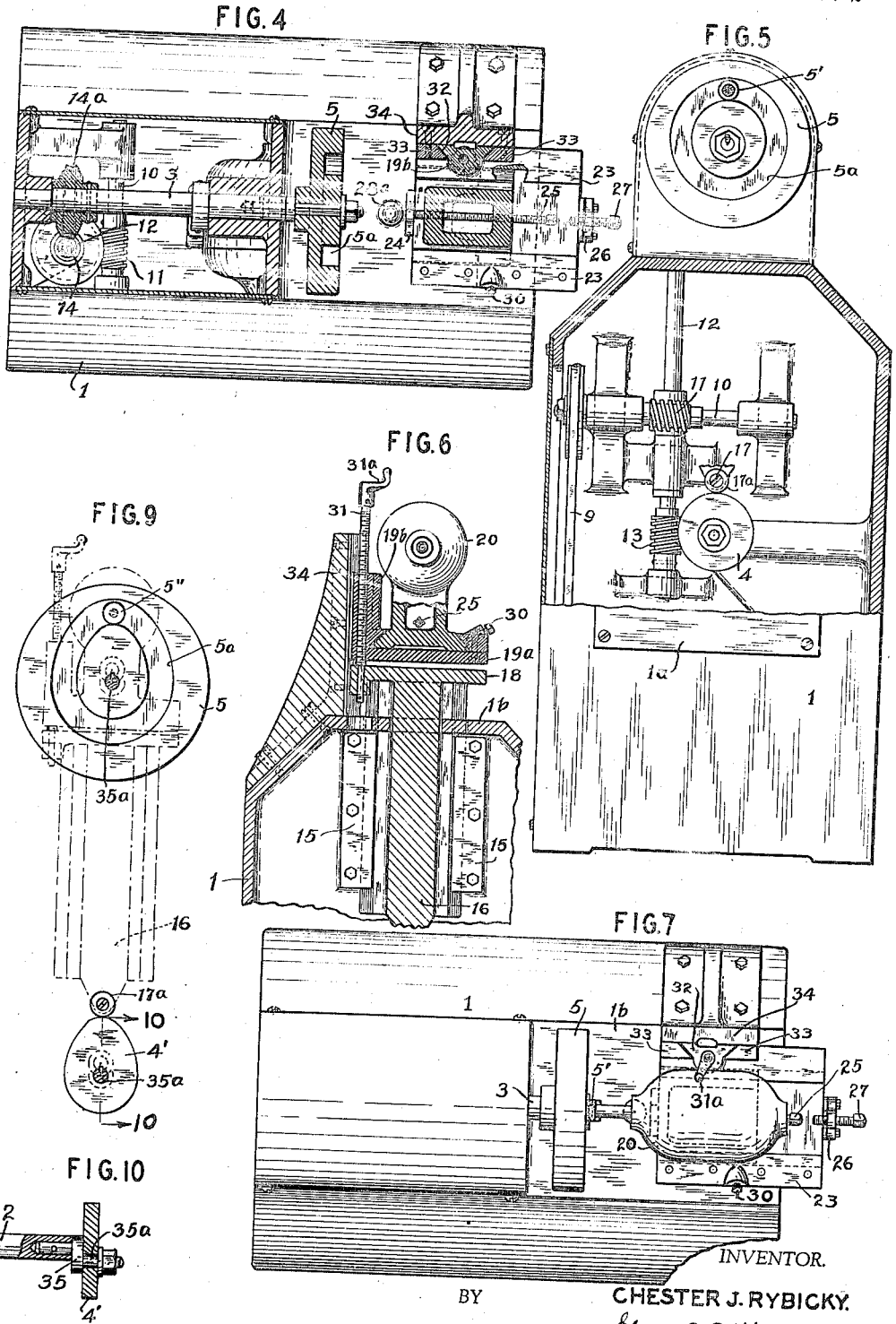

Patented July 1, 1941

2,247,412

UNITED STATES PATENT OFFICE 2,247,412

MACHINE FOR FINISHING FORMS

Chester J. Rybicky, Cleveland, Ohio

Application March 25, 1940, Serial No. 325,779

10 Claims. (Cl. 51—101)

This invention relates to a grinding machine capable of grinding continuous surfaces on work pieces, more particularly the walls of edge cams and the walls of face cams.

One object of the invention is to provide a machine of this type capable of efficiently operating automatically to turn out a large number of finished work pieces in a comparatively short period of time.

Another object of the invention is to provide a machine of this type wherein the tool may be readily adjusted relative to the wall or walls of the work piece to be finished and the tool and work piece relatively positioned for operation or to permit the removal of either thereof or re-grinding of the tool.

Another object of the invention is to provide a machine of this type of simple construction.

Other objects of the invention will be apparent to those skilled in the art to which my invention relates from the following description taken in connection with the accompanying drawings, wherein Fig. 1 is a view of a machine embodying my invention, substantially on the line 1—1 of Fig. 3, with parts broken away.

Figs. 2, 3, 4, 5 and 6 are sections on the lines 2—2, 3—3, 4—4, 5—5 and 6—6, respectively, of Fig. 1.

Fig. 7 is a plan view.

Fig. 8 is a fragmentary elevation.

Fig. 9 is a fragmentary elevation showing a modification.

Fig. 10 is a section on the line 10—10 of Fig. 9.

In the drawings, 1 indicates as an entirety a frame preferably of hollow form enclosing certain parts of the machine and provided with a door or removable section 1a. 2, 3, indicate a pair of shafts arranged in parallel relation and preferably one above the other, each shaft being mounted in suitable bearings provided in the frame 1. In this arrangement the lower shaft 2 has removably secured to its outer end a master form or cam 4 and the upper shaft 3 has removably secured to its outer end a work piece 5, which for illustrative purposes is formed on its outer face with a continuous groove or channel 5a, the walls of which are to be ground or finished, by a suitable tool 5'. As shown in Fig. 5, the groove 5a is eccentric to the axis of the shaft 3, but it may be otherwise shaped as shown in Fig. 9. The shaft 2 supports at its outer end a pin 6 having a collar 6a against which the master form 4 is secured by a nut 7, the pin and master form being keyed together so that the latter will be positively driven. By preference, the work piece 5 is mounted on and driven by the shaft 3 similarly to that employed for mounting and driving the master form 4.

The shafts 2, 3, are driven at the same speed by a suitable driving means, that illustrated comprising the following: 8 indicates a motor, the shaft of which through an endless device 9 drives a shaft 10. The shaft 10 is provided with a worm 11, which meshes with a worm gear 11a fixed to a shaft 12. The shaft 12 is provided with a lower worm 13 and an upper worm 14, which mesh with worm gears 13a, 14a, respectively, the worm gears 13a, 14a, being fixed to the shafts 2, 3, respectively, to drive the latter. The drive means shown serves to reduce the speed of the shafts 2, 3, relative to that of the motor shaft to meet the desired operating conditions.

As will be seen from the foregoing description, the master form 4 and work piece 5 are mounted on the shafts 2, 3, respectively in the same angular relation so that the tool 5', which is moved by the master cam 4 in directions at right angles to the shaft 3 may engage the cam wall throughout its length, during revolution of the work piece. The operating connections between the master form 4 and tool 5' for moving the latter are indicated as an entirety at 5x and preferably consist of the following: 15 indicates guide-ways supported by the walls of the frame 1 and extending above and below the top wall 1b thereof. The guide-ways 15 slidably support a reciprocating member 16 having on its lower end a stud shaft 17 which carries a freely rotatable roller 17a arranged to ride on the master form 4, whereby the latter reciprocates the member 16. The upper end of the reciprocating member is provided with a base 18 on which is mounted a support 19. The support 19 consists of a bottom plate or member 19a and an upwardly extending side member 19b. The bottom plate 19a supports a motor 20, the shaft of which carries the suitable tool 5' for engaging with and grinding each wall of the groove 5a. The base of the motor 20 is provided with guides 22 slidably engaging ways 23 on the bottom plate 19a and extending parallel to the axis of the shaft 3, whereby the motor 20 may be moved in a direction axially of its shaft and the shaft 3, either to position the tool 5' for engagement with a wall of the work piece to be ground and finished or to position the tool out of engagement therewith where a work piece is to be positioned on the shaft 3 or removed therefrom or the tool 5' is to be removed from the motor shaft or re-ground. The motor 20 is arranged to be moved in either direction manually, adjustable stops being provided to limit such movement in each direction. One stop consists of a wall 24 projecting upwardly from the inner end of the bottom plate 19a and a screw 25 arranged to engage therewith at its inner end, the screw being threaded through an opening formed in the motor base (see Fig. 4). By turning the screw 25 its free or inner end is adjusted inwardly or outwardly to limit the inward movement of the motor 20 and tool 5' at a predetermined position dependent upon the depth of the cam groove 5a and/or the spacing of the work piece relative to the reciprocating member 16. The other stop consists of a wall 26 projecting upwardly from the outer end of the bottom plate 19a and formed with a threaded opening for a screw 27, the inner or free end of which is arranged to be engaged by the motor base when the latter is moved outwardly. By turning the screw 27, its inner end is adjusted toward or from the wall 26'. The stop screw 27 is preferably employed to limit the outward movement of the motor 20 to predeterminately position the tool 5' in position for regrinding by a diamond 28 as shown in Fig. 8. When the motor 20 and tool 5' are moved in either direction the desired distance or to the end of their movement, as limited by the wall 24 or screw 27, they may be locked against movement on the support 19 by a set screw 30. The diamond 28 is preferably mounted on the upper end of a screw 29 which has screw threaded engagement with the walls of an opening formed in the top wall 1b to permit the diamond to be supported in an inoperative position (see Fig. 1) or raised into engagement with the tool 21 (see Fig. 8). When not in use, the diamond 28 is covered by a cap 28a.

Means are provided for adjusting the tool 5' relative to the shafts 2, 3, so that when a predetermined shaped master form is mounted on the shaft 2 and a work piece having a similarly shaped wall or walls is mounted on the shaft 3, the tool may be moved into grinding relation to one of said walls. The adjusting means shown for illustrative purposes consist of a screw 31 extending through a threaded opening formed in the upright side member 19b, the lower end portion of the screw being reduced and rotatably fitting an opening formed in the base 18 and provided with a pin adjacent its free end to prevent removal of the screw, the shoulder formed by the reduced end of the screw engaging the base 18. In this arrangement, the operation of turning the screw 31 serves to raise or lower the motor support 19 relative to the base 18, the effect of which is to move or adjust the tool 5' in a direction at right angles to the shaft 3. The screw 31 is provided with a handle 31a. The screw 31 in the present disclosure forms the connection between the base 18 and support 19 as well as the raising and lowering means for the latter. To relieve strains on the screw, the side member 19b is shaped to provide guides 32 which engage ways 33 carried by a wall 34 fixed to and extending upwardly from the frame 1.

From the foregoing description, it will be apparent that the tool 5' may be used to grind edge cams, as well as face cams. It will be noted that where the operating means for the tool 5' consists of a reciprocating member as herein disclosed, the tool is operated in a plane which cuts the axes of the shafts 2, 3. It will also be noted that in the preferred arrangement, the member 16 reciprocates vertically and carries on its upper end the tool driving or rotating means, the weight of which is utilized to maintain the roller 17a in engagement with the master form 4. It is preferable to rotate the shafts 2, 3, in the same direction and at the same speed, but where the cam walls on opposite side of the major axis of the cam are symmetrical thereto, the shafts 2, 3, may be driven at the same speed but in opposite directions.

Where the cam to be finished has a long throw, and it is desired to limit the travel of the reciprocating member, a distance less than that of the cam throw, I provide on each shaft 2, 3, a crank 35 having a pin or stud 35a and secure a master form 4' to one crank pin and a work piece 5' to the other crank, as shown in Figs. 9 and 10, the form 4 and work piece 5 being angularly disposed on the pins 35a so that the long throw of each is on that side of the adjacent shaft remote from the crank pin.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

The rotatable tool 5' is shown engaging the inner wall of the cam groove 5a. When this wall is ground, the machine is stopped and the support 19 is adjusted upwardly to position the tool in grinding relation to the outer wall of the groove.

It will be understood that suitable gages may be attached to the machine to indicate the adjustment of the tool axially of the shaft 3 or at right angles thereto.

What I claim is:

1. In a machine of the class described, the combination with a support, of pairs of bearings fixedly mounted on said support, a shaft mounted in each pair of bearings, means for driving said shafts at predetermined speeds, a master form mounted on one of said shafts, means for securing to the other shaft a work piece having a wall to be finished, guides on said support extending in a direction at right angles to one of said shafts, and a member reciprocatable in said guides and having a device arranged to engage said master form and be reciprocated thereby and a driven tool for engaging with the wall of the work piece to be finished, said device and tool being mounted on said reciprocatable member to move rectilineally in a plane cutting the axes of said shafts.

2. A machine as claimed in claim 1 wherein the support for said tool is adjustable on said member.

3. A machine as claimed in claim 1 wherein means are provided for moving the tool into and out of engagement with the wall of the work piece to be finished.

4. A machine as claimed in claim 1 wherein means are provided for moving the tool into and out of engagement with the wall of the work piece to be finished and means for adjusting the tool support in a direction at right angles to the axis of the shaft for the work piece.

5. In a machine of the class described, the combination with a support, of a pair of shafts, means for driving said shafts at predetermined speeds, a master form mounted on one of said shafts, means for securing to the other shaft a work piece having a wall to be finished, guides on said support extending in a direction at right angles to one of said shafts, a member reciprocatably mounted on said guides and having a device arranged to engage said master form and be reciprocated thereby, a motor supported on said reciprocatable member, and a tool driven by said motor for operating on the wall of the work piece to be finished, said device and said tool being mounted to move rectilineally in a plane cutting the axes of said shafts.

6. A machine as claimed in claim 5 wherein means are provided for adjusting the tool and mtor in a direction at right angles to the shaft for the work piece.

7. In a machine of the class described, the combination with a support, of a pair of shafts mounted on said support in parallel relation, means for driving said shafts at the same speed, a master cam mounted on one of said shafts, means for securing to the other shaft a work piece formed on its face with a continuous groove one side wall of which is to be finished, a member reciprocatably mounted on said support, a device on said reciprocatable member arranged to ride on said master cam, whereby the latter reciprocates said member, a support on said member, a tool adjustably mounted on the last mentioned support, whereby said tool may be moved toward or from the work piece to position the tool in the work piece groove, means for adjusting said tool support in a direction at right angles to the shaft for the work piece to engage the tool with the wall of the work piece to be finished, and means for driving said tool.

8. In a machine of the class described, the combination with a frame, of a shaft for a work piece formed on its face with a continuous groove the side walls of which are to be finished, a separate shaft, supports for said shafts on said frame, a tool for engaging with each of the side walls to be finished, a member reciprocatable on said frame in a plane cutting the axes of said shafts, a support for said tool on said member, means for adjusting said tool support toward and from the work piece for projection into and out of the work piece groove and radially of the work piece for positioning the tool into engagement with either side wall of the groove, means for driving said shafts at predetermined speeds, a master form on said separate shaft operatively connected to said member for controlling the reciprocating movement of said tool, and means for driving said tool.

9. In a machine of the class described, the combination with a frame, of a shaft for a work piece having spaced walls to be finished, a support for said shaft on said frame, a tool arranged to engage with either of the work piece walls to be finished, a reciprocatable member on said frame, a support for said tool on said member, means for adjusting said tool support on said member in a direction at right angles to the axis of the first mentioned shaft to position said tool in engagement with either of the work piece walls, one of said supports being movable toward and from the other support, whereby the work piece and tool may be operatively related to permit operation of the tool and dis-related to permit removal of the work piece or removal of the tool, a separate shaft on said frame, means for driving said shafts at predetermined speeds, a master form on the last mentioned shaft operatively connected to said member for controlling the movement of said tool, and means for driving said tool.

10. In a machine of the class described, the combination with a frame, of a shaft for a work piece having spaced walls to be finished, a support for said shaft on said frame, a tool arranged to engage with either of the work piece walls to be finished, a reciprocatable member on said frame, a motor on said member for supporting and driving said tool, means for adjusting said motor on said member in a direction at right angles to the axis of the first mentioned shaft to position said tool in engagement with either of the work piece walls, and toward and from the said shaft support, whereby the work piece and tool may be operatively related to permit operation of the tool and dis-related to permit removal of the work piece or removal of the tool, a separate shaft on said frame, means for driving said shafts at predetermined speeds, and a master form on the last mentioned shaft operatively connected to said member for controlling the movement of said tool.

CHESTER J. RYBICKY.